US005703553A

United States Patent [19]

Bushko et al.

[11] Patent Number: 5,703,553
[45] Date of Patent: Dec. 30, 1997

[54] MAGNETOSTRICTIVE ACTIVE STRUT

[75] Inventors: Dariusz Antoni Bushko, Hopkinton; Kevin Michael Avakian, Tewksbury, both of Mass.; Bruce Graham Johnson, Monument, Colo.; Michael Jonathan Gerver, Brookline, Mass.

[73] Assignee: SatCon Technology, Corp., Cambridge, Mass.

[21] Appl. No.: 653,522

[22] Filed: May 24, 1996

[51] Int. Cl.$^6$ .................................................. H01F 7/00
[52] U.S. Cl. .............................. 335/215; 310/26; 318/118
[58] Field of Search ........................... 335/215; 310/26; 318/118

[56] References Cited

U.S. PATENT DOCUMENTS

| | | | |
|---|---|---|---|
| 4,959,567 | 9/1990 | Ealey et al. | 335/215 |
| 5,361,053 | 11/1994 | Hosokawa et al. | 335/215 |
| 5,389,845 | 2/1995 | Brimhall | 310/26 |
| 5,510,660 | 4/1996 | Flatau et al. | 310/26 |

*Primary Examiner*—Stuart N. Hecker
*Attorney, Agent, or Firm*—Brian L. Michaelis

[57] ABSTRACT

A magnetostrictive active member configured to withstanding significant bending moments and having a prestress mechanism that is adjustable for maintaining optimal performance of an integral magnetostrictive element. The magnetostrictive active member includes a magnetostrictive actuator and parallel flexures incorporated in a housing to create a load path for bending moments to be carried by the housing, through the parallel flexures, as opposed to being carried by the magnetostrictive actuator. A plurality of ball-joints are integrated with the flexures and magnetostrictive actuator, receiving compressive forces and ensuring that no moments are applied to the magnetostrictive actuator. A prestress or preload mechanism is incorporated which provides a compressive preload to the magnetostrictive actuator internal to the housing. The preload mechanism includes an adjustable nut than is externally accessible to adjust the preload and facilitate optimal performance of the magnetostrictive actuator. Sensors integral to the active member housing include a load cell which measures both the internally generated preload and the external axial load, as well as the force produced by the actuator. A plurality of non-contact capacitive displacement sensors are contained in the housing and used in generating a displacement output signal. An integral flux sensor accurately measures the magnetic field applied to the magnetostrictive actuator. Modular end fittings are implemented to facilitate use of the same fittings as passive members that may be used in a mechanical structure, so that an active member can be easily installed in a location that may have contained a passive member.

18 Claims, 3 Drawing Sheets

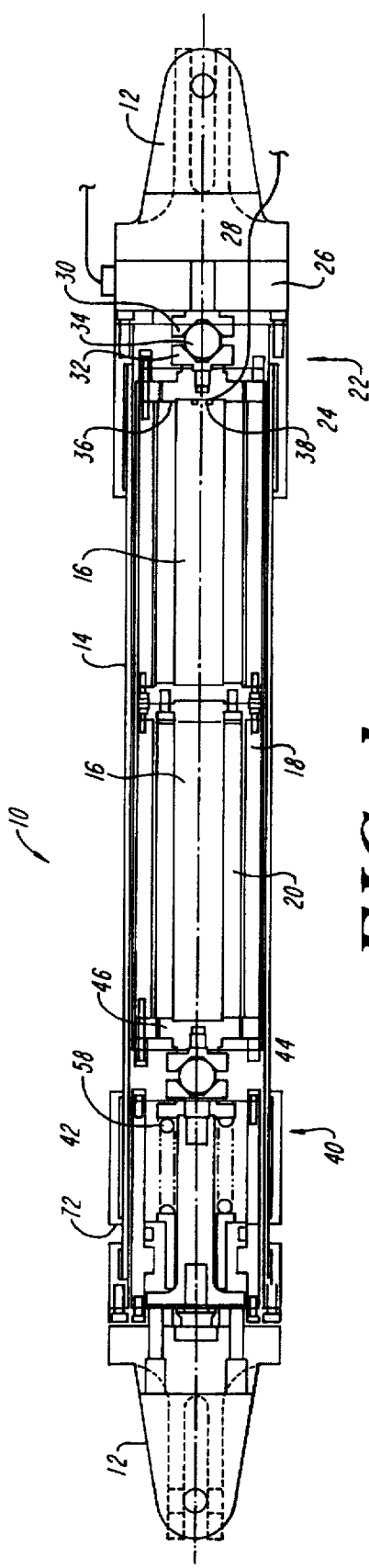
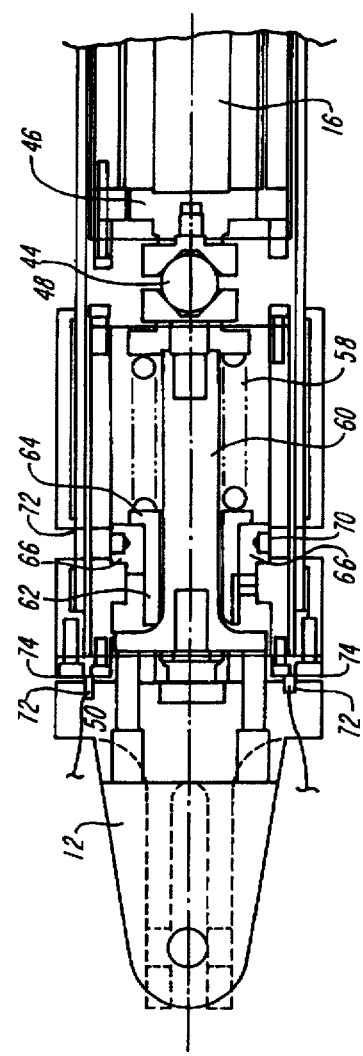
FIG. 1
FIG. 2

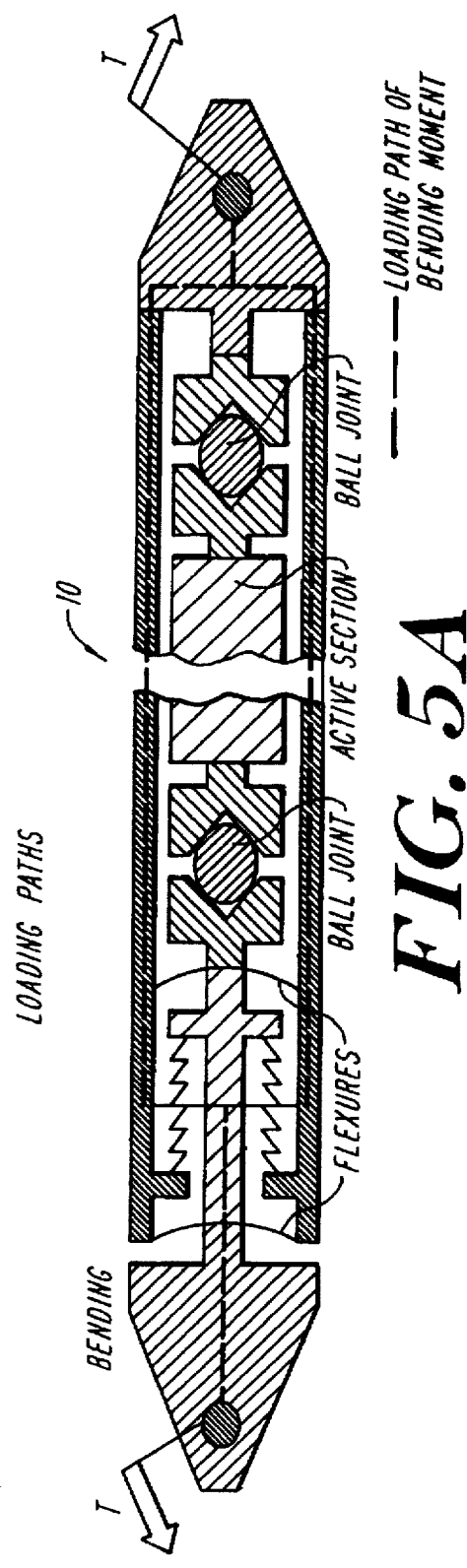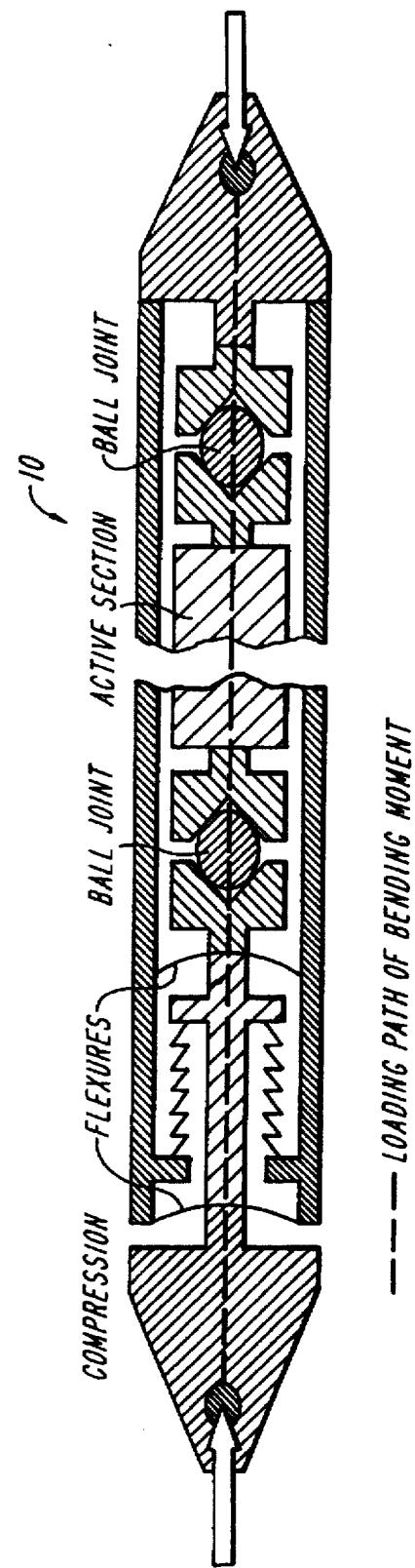

MAGNETOSTRICTIVE ACTIVE STRUT

This invention was made with Government support under contracts; FO 4611-89-C=0009 (Edwards AFB, AFSC). The Government has certain rights in the invention.

FIELD OF THE INVENTION

The present invention relates to structural members, and in particular to active structural members or struts for controlling elastic vibrations in a structure subject to structural motion.

BACKGROUND OF THE INVENTION

Active members or struts are known for controlling elastic or mechanical vibrations in structures, such as parabolic reflectors, large segmented optical systems and truss-based space structures. "Active" members or struts used to control elastic vibrations of structures typically integrate the functions of a truss structural element, an actively controlled actuator, and displacement sensor(s). The active members are activated to control structural motion and vibration, and can control structural motion to the sub-micron level. For space based applications active members must be able to function well at cryogenic temperatures.

Known active members typically incorporate piezoelectric or electrostrictive type actuators. Such actuators are capable of producing high accuracy position control active members. However, such known active members have some disadvantages in certain applications. Specifically, high voltages on the order of 1,000 volts are typically required for piezoelectric and electrostrictive actuators, presenting numerous issues associated with power sourcing. Such actuators, are also known to perform poorly at cryogenic temperatures.

So called "giant" strain magnetostrictive materials being used in actuators, have similar properties relative to piezoelectric and electrostrictive materials used in active actuator applications. Such magnetostrictive materials change shape (strain) in the presence of magnetic fields by up to 2000 μ-strain (ppm) at room temperatures, which is twice the strain available in the best piezoelectric or electrostrictive materials. With magnetostrictive materials, achieving such large strains does not require the use of high voltages. Additionally, in contrast to piezoelectric or electrostrictive materials, magnetostrictive materials perform better at cryogenic temperatures, with strain capabilities of over 5000 y-strain. Given the superior performance at cryogenic temperatures, magnetostrictive devices are the preferred mechanism for active members especially in view of the fact that at cryogenic temperatures hyperconductors or superconductors can be used in electrical coils to significantly reduce D.C. power consumption.

Magnetostrictive materials have been implemented in linear actuators, such as Terfenol-D® magnetostrictive actuators produced by ETREMA Products Inc., a Subsidiary of EDGE Technologies, Incorporated. Terfenol-D® magnetostrictive actuators are commercially available actuators typically incorporating a room temperature, high performance magnetostrictive material, Terfenol-D, which increases in length when a magnetizing field is applied parallel to the material drive axis. Magnetostrictive strain depends only on the magnitude of the magnetizing field, not its sign. Bi-directional actuation can be achieved by inclusion of permanent magnets to bias the Tefenol-D material to elongation of some degree, e.g. one half, of its linear range enabling actuation about the bias point. Some sort of mechanical prestress is generally desirable, as it has been determined that the best performance of Terfenol-D actuators is achieved by configuring the magnetostrictive actuator with mechanical prestress or compressive preload.

Known magnetostrictive actuators have limitations and present significant design issues when incorporated in structures as active structural members. Magnetostrictive materials, such as Terfenol-D, formed as a rod configured in an actuator, tend to be very brittle. While the actuators can withstand significant compressive axial loads, the magnetostrictive material is unable to withstand significant bending moments exerted on the rod without breaking. Additionally, prestress for optimal performance can present difficulties in that it is typically implemented in a fixed manner by inclusion of a biasing mechanism or spring internal to the actuator. The performance of such a prestress mechanism does not allow for compensation of different external loads which may be seen at different locations in a truss structure. Accordingly, less than optimal performance of the actuator may result.

SUMMARY OF THE INVENTION

The present invention provides a magnetostrictive active member configured to withstand significant bending moments and having a prestress mechanism that is adjustable for maintaining optimal performance of an integral magnetostrictive element.

According to the invention, the magnetostrictive active member includes a magnetostrictive actuator and a pair of flexures disposed in parallel and incorporated in a housing assembly to create a load path for bending moments to be carried by the housing, through the parallel flexures, as opposed to being carried by the magnetostrictive actuator. A plurality of ball-joints are integrated with the flexures and magnetostrictive actuator, receiving compressive forces and ensuring that no moments are applied to the magnetostrictive element(s) of the actuator. A prestress or preload mechanism is incorporated which provides a compressive preload to the magnetostrictive actuator internal to the housing. The preload mechanism includes an adjustable nut that is externally accessible to adjust the preload of the magnetostrictive actuator.

In further accord with the invention integral sensors are incorporated in the active member housing. A load cell incorporated in the housing measures both the internally generated preload and the external axial load, as well as the force produced by the actuator. A plurality of non-contact capacitive displacement sensors are contained in the housing and used in generating a displacement output signal. An integral flux sensor accurately measures the magnetic field applied to the magnetostrictive actuator. Modular end fittings are implemented to facilitate use of the same fittings as passive members used in a mechanical structure.

Features of the invention include provision of a highly reliable magnetostrictive actuator that is substantially free of bending moments and/or compressive forces exerted on the actuator to substantially preclude damage to delicate magnetostrictive active elements. The externally adjustable preload mechanism facilitates prestress to the actuator to effect optimal performance of the magnetostrictive actuator. Integral sensors provide information output relating to the performance of the actuator and facilitate interfacing of the actuator with a computer control system. Modular end fittings with quick connect couplings facilitate ease of replacement and installation of the active member in a location in a structure that may have contained a passive member.

BRIEF DESCRIPTION OF THE DRAWING

The foregoing and other features and advantages of the present invention will become more apparent in light of the following detailed description of an illustrative embodiment thereof, taken in conjunction with the accompanying drawing in which:

FIG. 1 is a plan view, in section, of a magnetostrictive active member according to the invention;

FIG. 2 is an enlarged, plan view of a flexure end of the magnetostrictive active member of FIG. 1;

FIG. 5A is a schematic representation of moment carrying elements and the loading paths of bending moments applied to the magnetostrictive active member of FIG. 1; and FIG. 5B is a schematic representation of moment carrying elements and the loading paths of compressive forces applied to the magnetostrictive active member of FIG. 1.

DETAILED DESCRIPTION

Figure 3:
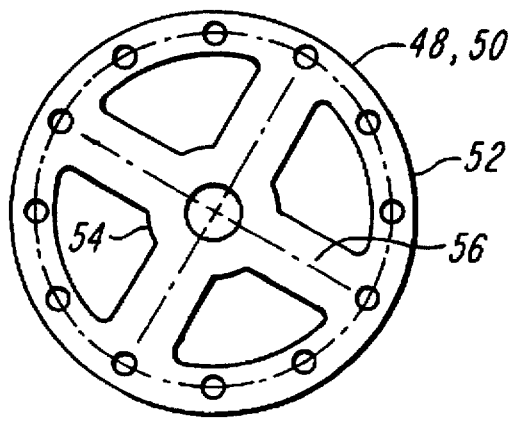
FIG. 3 is a plan view of a flexure portion of the magnetostrictive active member of FIG. 1.

An active member or strut 10, according to the invention and as illustrated in FIG. 1, is configured to include modular end fittings 12 at extreme ends of the member 10. The particular type of end fittings will be a function of the application or environment in which the active member is used. In this illustrative embodiment, quick connect coupling end fittings are used to facilitate ease of installation and to provide for direct replacement of non-active struts or members within a structure, with active members.

The mechanical design of the magnetostrictive active member 10, takes into consideration the objectives of maximizing active member stroke and force capability, while accommodating the brittle nature of the preferred "giant" strain magnetostrictive material under load. The components of the active member 10 are contained in an outer tube 14, which is a tubular segment of durable material, such as carbon fiber composite, capable of withstanding significant loads diverted to the housing by a mechanical configuration, discussed in detail hereinafter.

The tube 14 houses a pair of magnetostrictive active elements 16 in a series configuration. The active elements 16 are Terfenol-D rods configured as magnetostrictive actuators, as known in the art. The tube 14 includes permanent magnets 18 located proximate to the magnetostrictive actuators to effect biasing of the magnetostrictive elements and enable bidirectional actuation. At least one magnetic coil 20 surrounds the magnetostrictive elements 16 to effect actuation or axial displacement when the coils are energized.

The actuator 10 has a load cell end 22 that includes a load cell end housing 24 engaging an end of the tube 14. A load cell transducer 26 is disposed between the end fitting 12 and the load cell end housing 24. In this illustrative embodiment, the load transducer 26 is a strain-gauge type load cell, such as a Sensotec, model 41 "pancake-thin profile" load cell available from Sensotec, Columbus, Ohio. In this implementation, the load cell 26 is configured to sense the force proximate to an inner threaded hub 28 thereof.

A first ball joint disposed interior to the load cell end housing 24 is comprised of a first socket portion 30, a second socket portion 32 and a ball 34 disposed therebetween. The first socket portion is configured to engage and exert forces on the load cell 26 proximate to the inner hub 28. The second socket portion 32 is configured to engage a support plate 36 that abuts an end of the magnetostrictive element 16. Compressive forces exerted by and on the magnetostrictive elements 16 are transferred through the ball joint at the load cell end 22 and are sensed by the load cell 26 which measures the total load on the magnetostrictive actuator. The ball joint ensures that no bending moments are applied to the active magnetostrictive active elements.

An integral flux sensor 38 is also disposed at the load cell end 22 of the magnetostrictive active member according to the invention. The flux sensor 38 in this illustrative embodiment is a low-profile Bell hall effect sensor which is mounted in a radial gap of the magnetostrictive element 16 interior to the load cell end housing 24. The flux sensor 38 provides an output indicative of the magnetic flux of the Terfenol-D rods configured as magnetostrictive actuator(s).

The actuator 10 according to the invention has a flexure end 40 that includes a flexure end housing 42 engaging an end of the tube 14 distal to the load cell end 22. A second ball joint 44 is disposed next to a second support plate 46 abutting an end of the magnetostrictive elements 16 proximate to the flexure end 40. The second ball joint 44, like the first ball joint, ensures that no bending moments are applied to the active magnetostrictive active elements 16.

The first and second ball joints must be stiff in the axial direction, since they are directly in the load path, but the ball joints should have substantially no bending stiffness. To reduce the bending stiffness or friction of the ball joints, they are designed to have a low coefficient of friction between the ball and socket. The ball and socket, however, must be capable of carrying large axial loads. Accordingly, a hardened steel ball and socket are used, having a titanium anodic coating that provides a coefficient of friction of approximately 0.08 at approximately 200,000 PSI axial loadings.

One of the socket portions of the second ball joint 44 is connected to a first flexure 48 of a pair of flexures, comprised of the first flexure 48 and a second flexure 50, that are disposed parallel to one another interior to the flexure end housing 42. The pair of flexures 48, 50, best seen in FIGS. 2 and 3, work in combination with the ball joints 34, 44, discussed hereinbefore, to transfer forces from bending moments applied to the active member to an external shell comprised of the flexure end housing 42, the tube 14 and the load cell end housing 24.

Referring now to FIG. 3, the first and second flexures 48, 50, consist of an outer ring 52 having a plurality of holes for receiving mechanical fastening means, such as bolts, for fastening the flexures to portions of the flexure end housing 42. The outer ring 52 is connected to an inner ring 54 via four mutually orthogonally disposed interconnect members 56. The inner ring 54 has a void at the center thereof to facilitate connection of the flexures to portions of the active member assembly as discussed.

A significant design consideration of the flexures 48, 50, in order to facilitate their function, is that they have high moment stiffness and low axial stiffness. Each flexure by itself has low axial stiffness but high radial stiffness. Combined together, separated by an appropriate amount of axial distance (just a few inches in the case of this illustrative embodiment), the two flexures provide both high radial and bending stiffness, but low axial stiffness. In this illustrative embodiment, the flexures are made from one-half millimeter thick half-hardened Be-Cu, which is chosen for its high fatigue strength.

Figure 4:
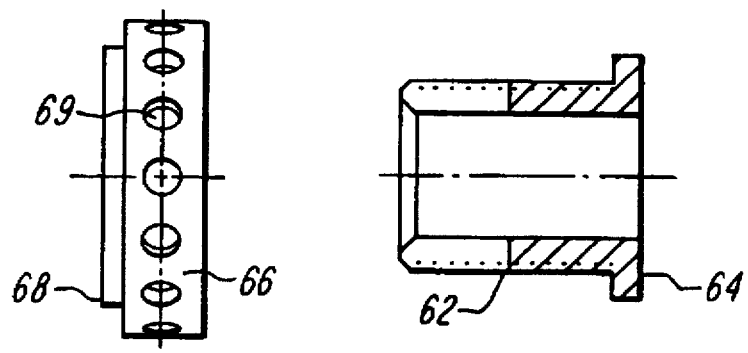
FIG. 4 is a plan view of a nut and threaded adjuster of a preload mechanism of the magnetostrictive active member of FIG. 1.

A preload mechanism is disposed interior to the flexure end housing 42 between the pair of flexures 48, 50. The preload mechanism is comprised of a spring 58 abutting a member at the backside of the socket portion of the second ball joint 44 closest to the flexure end 40. The spring is disposed about a shaft 60. A threaded adjuster 62 having threads disposed on an exterior surface thereof (best seen in FIG. 4), includes an abutment surface 64 configured to engage an end of the spring 58. A nut 66 includes an interior threaded surface 68 that engages the exterior threads of the threaded adjuster 62. The nut 66 has an outer surface that includes a plurality of recesses 69 configured to receive prongs of a preload tool (not shown). The preload tool engages recesses 69 through tool gap(s) 70 in the flexure end housing. The tool gap 70 accommodates the preload tool, which engages the recesses 69 in the nut 66, so that actuation of the tool effects rotation of the nut 66. Rotation of the nut 66 adjusts the position of the threaded adjuster 62 to change the compression of the spring 58. The spring 58 in turn exerts force on the ball joint 44 which is transferred to the magnetostrictive element 16 through the support 46. Accordingly, preload of the magnetostrictive element is externally adjustable as a function of the compressire force exerted thereon, without the need to disassemble the active member.

A pair of non-contact, capacitive displacement sensors is disposed at the flexure end 40 of the active member 10. The two sensors are substantially equally spaced from a center line of the active member to measure the displacement of the active member by measuring a distance at a displacement gap 74. The displacement sensors implemented in this illustrative embodiment are threaded probe, non-contact displacement sensors, such as HPT-150-F-E-L3-3-B sensors available from Capacitec, Inc., Ayer Mass. The sensors confront a surface of the mechanics housing across the displacement gap 74. The average of the two sensors is used as a displacement output signal. The use of two sensors allows the average output to be responsive to axial motion while not responding to bending motion.

Referring now to FIGS. 5A and 5B, the configuration according to the invention and described hereinbefore protects the active magnetostrictive elements 16 from damage due to torsional forces and bending moments. Bending moments are redirected by the flexures and ball joints. FIG. 5A illustrates the load paths of torsional forces applied to the active member 10. The flexure and ball joint system diverts bending moments to the housing and away from the active elements. Compressive forces, however, are carried straight through the active member. Accordingly, the active elements are protected and the member 10 provides a suitable active member for reliable vibration damping.

Although the outer tube and housing portions of the active member described herein are particularly described as tubular in shape and constructed of carbon fiber composite, it will be appreciated that hollow housings of a generally cylindrical nature having a cross-section other than round can be used, and they can be fabricated from other rigid, highly durable materials such as titanium, fiberglass, or the like.

Although a specific load cell capable of sensing tension and compression is described in the illustrative embodiment herein, it will be appreciated that other load sensors can be implemented, such as any of various standard strain gauges, piezoelectric sensors, or the like.

Although the invention is shown and described herein with respect to an illustrative embodiment thereof, it will be appreciated that the foregoing and various other changes, omissions and additions in the form and detail thereof may be made without departing from the spirit and scope of the invention.

What is claimed is:

1. A magnetostrictive active member, comprising:
   a housing configured to contain elements of said magnetostrictive active member;
   a magnetostrictive actuator member disposed within said housing and being configured for actuation in a first and second direction;
   a preload mechanism at least partially disposed within said housing, applying preload to said actuator member, said preload mechanism including a portion accessible from the exterior of said housing and being adjustable to change the preload applied to said actuator member; and
   a load path system substantially shielding said actuator member from at least bending moments to avoid excessive tensile stresses in said actuator member, said load path system comprising parallel flexures directing bending moments to said housing.

2. The magnetostrictive active member of claim 1 wherein said actuator member is a Terfenol-D rod.

3. The magnetostrictive active member of claim 1 wherein said housing contains a permanent magnet and said actuator member is biased using said permanent magnet.

4. The magnetostrictive active member of claim 1 wherein said load path system further comprises at least one ball joint.

5. The magnetostrictive active member of claim 1 wherein said preload mechanism comprises a spring member abutting a threaded adjuster having external threads thereon, and a nut portion having threads on an internal surface thereof, said nut portion being accessible from exterior of said housing and being actuatable to actuate said threaded adjuster to increase compression on said spring member.

6. The magnetostrictive active member of claim 1 further including a load cell internal to said housing configured to measure compressive forces exerted by and on said magntostrictive actuator member.

7. The magnetostrictive active member of claim 1 further including a flux sensor internal to said housing measuring magnetic flux of the magnetostrictive actuator member.

8. The magnetostrictive active member of claim 1 further including at least one displacement sensor configured to measure axial motion of said magnetostrictive actuator member.

9. The magnetostrictive active member of claim 8 wherein said at least one displacement sensor comprises two non-contact, capacitive sensors disposed substantially equally spaced from a center-line of said magnetostrictive actuator member and output from said two non-contact, capacitive sensors is averaged to provide a measurement of axial motion of said magnetostrictive actuator member.

10. A magnetostrictive active member, comprising:
    a housing configured to contain elements of said magnetostrictive active member;
    a magnetostrictive actuator member disposed within said housing and being biased by permanent magnetic biasing for actuation in a first and second direction;
    at least one magnetic coil disposed in said housing and configured to selectively apply a magnetic field to said magnetostrictive actuator member to effect said actuation in said first and second direction; and
    a load path system substantially shielding said magnetostrictive actuator member from at least bending moments to avoid excessive tensile stresses in said actuator member, said load path system comprising at least one flexure configured to direct bending moments to said housing.

11. The magnetostrictive active member of claim 10 further including a preload mechanism at least partially disposed within said housing, applying preload to said actuator member, said preload mechanism including a portion accessible from the exterior of said housing and being adjustable to change the preload applied to said actuator member.

12. The magnetostrictive active member of claim 11 wherein said preload mechanism comprises a spring member abutting a threaded adjuster having external threads thereon, and a nut portion having threads on an internal surface thereof, said nut portion being accessible from exterior of said housing and being actuatable to actuate said threaded adjuster to increase compression on said spring member.

13. The magnetostrictive active member of claim 10 wherein said actuator member is a Terfenol-D rod.

14. The magnetostrictive active member of claim 10 wherein said load path system further comprises at least one ball joint.

15. The magnetostrictive active member of claim 10 further including a load cell internal to said housing configured to measure compressire forces exerted by and on said magntostrictive actuator member.

16. The magnetostrictive active member of claim 10 further including a flux sensor internal to said housing measuring magnetic flux of the magnetostrictive actuator member.

17. The magnetostrictive active member of claim 10 further including at least one displacement sensor configured to measure axial motion of said magnetostrictive actuator member.

18. The magnetostrictive active member of claim 17 wherein said at least one displacement sensor comprises two non-contact, capacitive sensors disposed substantially equally spaced from a center-line of said magnetostrictive actuator member and output from said two non-contact, capacitive sensors is averaged to provide a measurement of axial motion of said magnetostrictive actuator member.

* * * * *